US012724450B2

(12) United States Patent
Liao

(10) Patent No.: US 12,724,450 B2
(45) Date of Patent: Sep. 1, 2026

(54) PROTECTIVE SUPPORT, PROTECTIVE SLEEVE APPARATUS AND CONTROL METHOD THEREOF

(71) Applicant: Chun Lam Group (International) Limited, Dongguan City (CN)

(72) Inventor: Jin Wen Liao, Dongguan City (CN)

(73) Assignee: Chun Lam Group (International) Limited, Dongguan City (CN)

( * ) Notice: Subject to any disclaimer, the term of this patent is extended or adjusted under 35 U.S.C. 154(b) by 141 days.

(21) Appl. No.: 18/676,741

(22) Filed: May 29, 2024

(65) Prior Publication Data

US 2025/0224762 A1 Jul. 10, 2025

(30) Foreign Application Priority Data

Jan. 5, 2024 (CN) ......................... 202410016307.4

(51) Int. Cl.
*G06F 1/16* (2006.01)
*A45C 11/00* (2006.01)
(Continued)

(52) U.S. Cl.
CPC ............ *G06F 1/1603* (2013.01); *A45C 11/00* (2013.01); *A45C 13/005* (2013.01);
(Continued)

(58) Field of Classification Search
CPC ...... G06F 1/1632; F16M 11/04; F16M 11/18; F16M 11/043; F16M 11/046
See application file for complete search history.

(56) References Cited

U.S. PATENT DOCUMENTS 5,708,561 A * 1/1998 Huilgol ................. G06F 1/1688 361/679.55
6,011,685 A * 1/2000 Otsuki ................... B60K 35/22 345/905

(Continued)

FOREIGN PATENT DOCUMENTS

AU 2015200203 B2 2/2015
CN 206714319 U * 12/2017

(Continued)

OTHER PUBLICATIONS

Extended European Search Report (EESR) from European Patent Application No. 24182687.4 dated Nov. 11, 2024.

(Continued)

*Primary Examiner* — Adrian S Wilson
(74) *Attorney, Agent, or Firm* — Budzyn IP Law, LLC

(57) ABSTRACT

The present invention relates to a protective support, a protective sleeve apparatus and a control method thereof. The protective support includes a backplane for carrying a backshell of a display device, and a supporting side that enables the backplane to be supported at an arbitrary angle to a datum plane. A hinge assembly is layable flat on the datum plane and flexibly connected with the backplane, so that the hinge assembly and the backplane are flippable relative to each other. A connecting assembly is arranged on the backplane and slidable relative to the supporting side of the backplane, where the connecting assembly is used for detachably connecting the backshell so that the backshell is rotatable relative to the backplane. Compared with the prior art, not only the height of the display device can be adjusted, but also the display device may be switched between horizontal display and vertical display.

13 Claims, 7 Drawing Sheets

(51) Int. Cl.
*A45C 13/00* (2006.01)
*F16M 11/04* (2006.01)

(52) U.S. Cl.
CPC ......... *F16M 11/043* (2013.01); *G06F 1/1632* (2013.01); *A45C 11/003* (2025.01)

(56) References Cited

U.S. PATENT DOCUMENTS 6,639,788 B1 * 10/2003 Liao ...................... G06F 1/1601 361/679.22
7,035,092 B2 * 4/2006 Hillman ................. F16M 11/40 361/679.06
7,082,028 B2 * 7/2006 Huilgol ................. G06F 1/1637 248/125.1
7,213,792 B2 * 5/2007 Choi .................... F16M 11/105 248/920
7,448,580 B2 * 11/2008 Shimizu .................... G09F 9/00 248/676
7,490,796 B2 * 2/2009 Kim ..................... F16M 11/105 248/292.12
7,546,150 B2 * 6/2009 Makino ............... H04M 1/0247 455/566
7,593,218 B2 * 9/2009 Hwang ............. F16M 11/2021 361/679.21
7,869,200 B2 * 1/2011 Horie .................... G06F 1/1601 361/679.17
8,200,296 B2 * 6/2012 Arakane ............... G06F 1/1616 455/566
8,230,992 B2 * 7/2012 Law ...................... G06F 1/1632 248/176.1
8,498,101 B2 * 7/2013 Chiang ................. G06F 1/1601 361/679.22
8,520,371 B2 * 8/2013 Peng .................... F16M 13/005 248/920
8,607,976 B2 * 12/2013 Wu ....................... G06F 3/0231 248/458
8,611,076 B2 * 12/2013 Wetzel ................... F16M 13/00 248/248
8,659,884 B2 * 2/2014 Segar ..................... F16M 11/22 361/679.22
8,934,232 B2 * 1/2015 Hsu ....................... G06F 1/1654 361/679.56
9,027,747 B2 * 5/2015 Hsu ....................... G06F 1/1626 206/45.2
9,131,756 B2 * 9/2015 Hurst ................. A45C 13/1069
9,201,466 B2 * 12/2015 Lai ........................ G06F 1/1681
9,241,422 B2 * 1/2016 Hsu .......................... H05K 7/18
10,001,242 B2 * 6/2018 van Hooft .............. A47B 23/04
10,133,102 B1 * 11/2018 Liu ......................... F16M 11/10
11,500,426 B2 * 11/2022 Godfrey .................. G06F 1/203
12,297,954 B2 * 5/2025 Do ......................... F16M 11/18
12,305,796 B2 * 5/2025 Chu ....................... F16M 11/18
2003/0235029 A1 * 12/2003 Doherty ................. H05K 1/028 361/679.27
2005/0029414 A1 * 2/2005 Jeong ................... F16M 11/105 248/122.1
2006/0007644 A1 * 1/2006 Huilgol ................. G06F 1/1616 248/917
2006/0033847 A1 * 2/2006 Kim .................. F16M 11/2021 348/836
2006/0038092 A1 * 2/2006 Choi .................... F16M 11/105 248/917
2006/0138298 A1 * 6/2006 Yuan ...................... F16M 11/10 248/371
2008/0158801 A1 * 7/2008 Mathews ............... F16M 11/18 361/679.07
2009/0237873 A1 * 9/2009 Flessas ................. G06F 1/1601 361/679.01
2011/0221319 A1 * 9/2011 Law ...................... G06F 1/1632 16/337
2012/0217174 A1 * 8/2012 Ting ...................... G06F 1/1628 206/45.2
2013/0134061 A1 * 5/2013 Wu ....................... G06F 1/1626 206/320
2015/0222986 A1 * 8/2015 Hagman .................. H04R 1/44 381/334
2015/0288405 A1 * 10/2015 Gygax .................... H04M 1/04 455/575.1
2017/0023975 A1 * 1/2017 Nalbandian ........... G06F 1/1626
2019/0258292 A1 * 8/2019 Schatz .................. G06F 1/1683
2020/0285276 A1 * 9/2020 Lin ....................... G06F 1/1618
2021/0103316 A1 * 4/2021 Haffner ................. G06F 1/1624
2022/0100228 A1 * 3/2022 Chen ..................... G06F 1/1684
2022/0308621 A1 * 9/2022 Godfrey .................... G06F 1/20
2023/0243461 A1 * 8/2023 Chu ....................... F16M 11/18 361/807
2024/0060595 A1 * 2/2024 Do ....................... F16M 11/041
2024/0084956 A1 * 3/2024 Lee ...................... F16M 11/105
2024/0264636 A1 * 8/2024 Lee .................... F16M 11/2064
2024/0401737 A1 * 12/2024 Lee ........................ F16M 11/04

FOREIGN PATENT DOCUMENTS

CN 118058574 A * 5/2024 ........... A45C 13/005
CN 223926820 U * 2/2026
EP 4582901 A1 * 7/2025 ........... A45C 13/005
JP 2022079076 A * 5/2022
KR 20060072800 A 6/2006

OTHER PUBLICATIONS

Anonymous: "2023 Newest iFacemall Magnetic Rotating Case for Ipad with Foldable Slide Rails Stand," Jun. 26, 2023, XP093218206, retrieved from the Internet: URL:https://web.archive.org/web/20230626114747/https://myifacemall.com/en-ca/products/2023-newest-ipad-stylish-case#expand, retrieved on Oct. 28, 2024, the whole document.

* cited by examiner

PROTECTIVE SUPPORT, PROTECTIVE SLEEVE APPARATUS AND CONTROL METHOD THEREOF

TECHNICAL FIELD

The embodiment of the present application relates to a support, and in particular to a protective support, a protective sleeve apparatus and a control method thereof.

BACKGROUND

With the rapid development of technology, display terminal devices such as tablets and cell phones have become an indispensable part of people's daily life and work. They have won a wide range of user groups with their portability, versatility, and ease of use. However, with the continuous evolution of user needs, the use of traditional display terminal devices can no longer fully meet the needs of people in different scenarios. Therefore, the innovation and optimization of corresponding accessories have become particularly important.

SUMMARY

The object of the implement of the present application is to design a protective support, a protective sleeve for a display device, a protective sleeve apparatus and a control method thereof, which not only can further provide protection for the display device, but also can adjust a height of the display device, and can also make the display device be switched between horizontal screen and vertical screen, so that the display device can meet the needs of more scenarios of use.

In order to achieve the above object, the embodiment of the present application provide a protective support, including:

- a backplane, including a front side that may carry a backshell for attaching on a display device, a rear side opposite to the front side, and a supporting side arranged between the front side and the rear side that enables the backplane to be supported at an arbitrary angle to a datum plane;
- a hinge assembly, layable flat on the datum plane and flexibly connected with the backplane, so that the hinge assembly and the backplane are flippable relative to each other, and the hinge assembly and the front side of the backplane are opposite to each other when the hinge assembly is flipped in a direction close to the backplane to a limit position; and
- a connecting assembly, arranged on the backplane and slidable relative to the supporting side of the backplane, where the connecting assembly is used for detachably connecting the backshell so that the backshell is rotatable relative to the backplane.

In addition, the embodiment of the present application further provides a protective sleeve for the display device including:

- a protective support described above; and
- a backshell, arranged on the front side of the backplane and detachably connected with the connecting assembly, where the backshell is attachable to the display device, and the backshell is rotatable relative to the backplane through the connecting assembly.

In addition, the embodiment of the present application further provides a protective sleeve apparatus including:

- a protective sleeve as above;
- a first driving module used for driving the connecting assembly, so that the connecting assembly drives the backshell slidable relative to the supporting side of the backplane;
- a second driving module used for driving the connecting assembly, so that the connecting assembly drives the backshell rotatable relative to the backplane; and
- a main control unit electrically connected with the first driving module and the second driving module respectively;
- where, the main control unit is used for judging whether the backshell is in a preset position away from the supporting side according to a first instruction received, and controlling the first driving module when judging that the backshell is not in the preset position, so that the first driving module drives the connecting assembly to move in a direction away from the supporting side; and the main control unit is further used for controlling the second driving module when judging that the backshell is in the preset position, so that the second driving module drives the connecting assembly to drive the backshell to rotate into a vertical state; and
- the main control unit is used for judging whether the backshell is in an initial position close to the supporting side according to a second instruction received, and controlling the first driving module when judging that the backshell is not in the initial position, so that the first driving module drives to move in a direction close to the supporting side; and the main control unit is further used for controlling the first driving module when judging that the backshell is in the initial position, so that the first driving module drives the connecting assembly to drive the backshell to rotate to a transverse state.

In addition, the embodiment of the present application further provides a control method of the protective sleeve apparatus including the following steps:

- when receiving a first instruction, judging whether a backshell attached to the display device is in a preset position away from the supporting side of the backplane according to the first instruction;
- driving the backshell to move in a direction away from the supporting side if the backshell is judged not in the preset position;
- driving the backshell to rotate into a vertical state if the backshell is judged in the preset position;
- when receiving a second instruction, judging whether the backshell attached to the display device is in an initial position close to the supporting side of the backplane according to the second instruction;
- driving the backshell to move in a direction close to the supporting side if the backshell is judged not in the initial position; and
- driving the backshell to rotate, to a transverse state if the backshell is judged in the initial position.

The embodiment of the application relative to the prior art, as the hinge assembly of protective support is flexibly connected with the backplane, so that the backplane and the hinge assembly are flippable relative to each other, and through the flipping of the backplane, the angle of the backshell attached to the display device may be adjusted, so that the display device may be displayed at any angle. When the display device is not used, the hinge assembly may be flipped a direction close to the backplane to the limit position in, so that the hinge assembly and the backplane can be opposite to each other, and the display device may be effectively protected through the hinge assembly. In addition, the protective support further includes a connecting assembly, which is arranged on the backplane and is slidable relative to the supporting side of the backplane. The connecting assembly is detachably connected to the backshell, and the backshell is rotatable relative to the backplane after connected with the connecting assembly. Therefore, not only the height of the display device can be adjusted through the backshell, but the display device can be switched between a horizontal screen and a vertical screen, so that the display device can meet the use needs of more scenarios.

DETAILED DESCRIPTION

In order to make the purpose, technical scheme and advantages of the embodiment of the present application more clear, each embodiment of the present application will be elaborated in detail below in combination with the accompanying drawings. However, it may be understood by those of ordinary skill in the art that in each embodiment of the present application, many technical details have been presented in order to enable the reader to better understand the present application. However, it is possible to implement the technical solution sought to be protected by the present application though without these technical details and various changes and modifications based on the following embodiments.

Since the current display terminal device may be convenient for personal carrying, and with the continuous popularization of these terminal display devices and the different use scenarios, in order to protect these display terminal devices simultaneously, generally the backshell is attached to the device, and the existing backshell generally only plays the protection function of the display device and may adjust the inclination angle of the device. But such adjustments still cannot meet the use needs of some specific scenarios, for example, when the display device is not used, the existing backshell cannot further protect the display device, switch between the horizontal screen and the vertical screen, or cannot adjust the height of the device.

Figure 3:
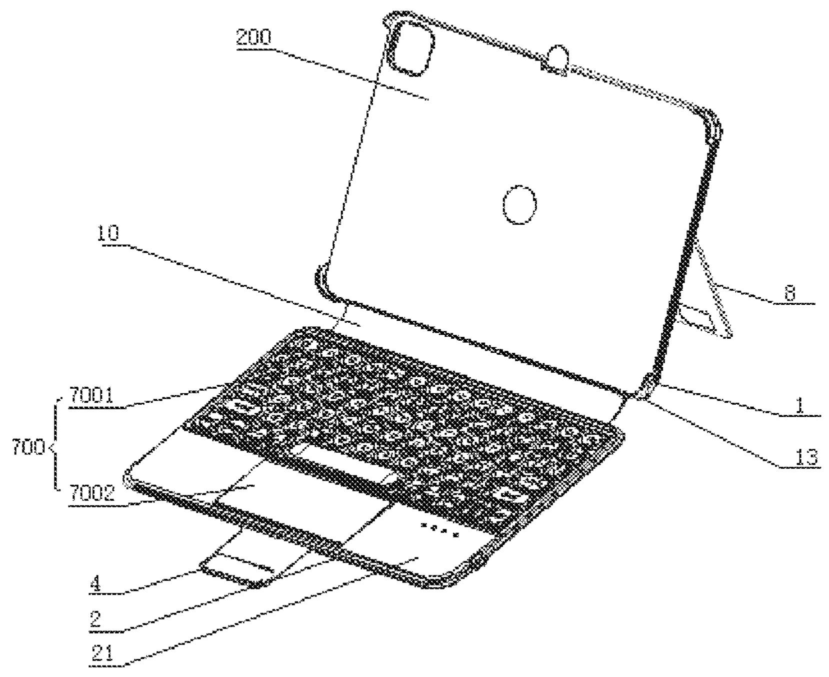
FIG. 3 is an axonometric drawing with the protective support being connected with a backshell in part of embodiments of the present application.
Figure 4:
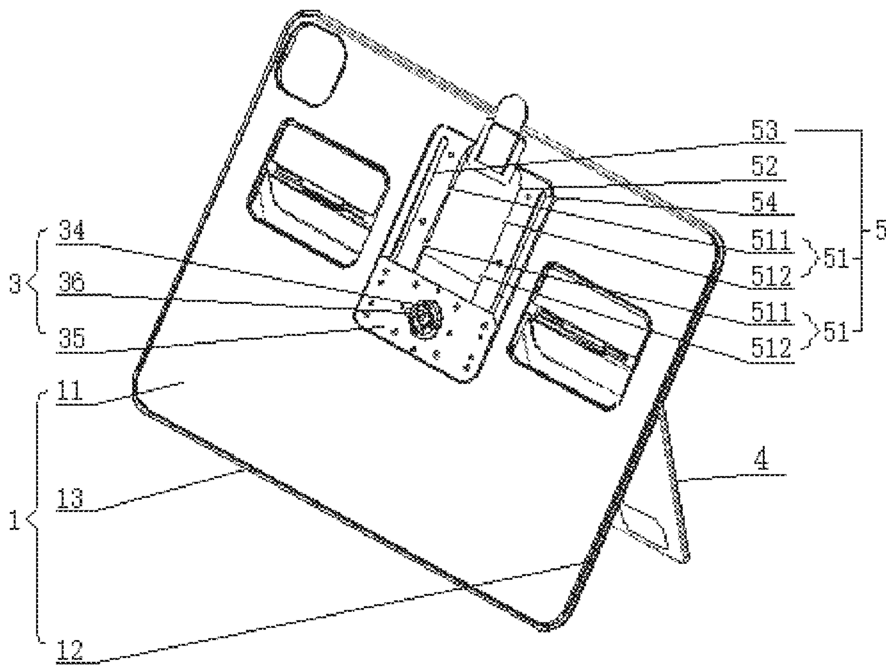
FIG. 4 is an axonometric drawing with a connecting assembly being connected with the backplane in part of embodiments of the present application.

Based on this, some embodiments provide a protective support, as shown in FIG. 3 and FIG. 4, and the protective support includes: a backplane 1, a hinge assembly 2 and a connecting assembly 3. As shown in FIG. 4, the backplane 1 includes: a front side 11 that may carry a backshell 200 for attaching on a display device 100, a rear side 12 opposite to the front side 11, and a supporting side 13 arranged between the front side 11 and the rear side 12 that enables the backplane 1 to be supported at arbitrary angle to a datum plane.

Secondly, as shown in FIG. 3, a hinge assembly 2 is layable flat on the datum plane, and flexibly connected with the backplane 1, so that the hinge assembly 2 and the backplane 1 are flippable relative to each other. The hinge assembly 2 and the front side 11 of the backplane 1 are opposite to each other when the hinge assembly 2 is flipped in a direction close to the backplane 1 to a limit position, so that the backshell 200 can be located between the hinge assembly 2 and the backplane 1.

In addition, as shown in FIG. 4, a connecting assembly 3 is arranged on the backplane 1, and slidable relative to the supporting side 13 of the backplane 1. In combination with FIG. 3, the connecting assembly 3 is used for detachably connecting the backshell 200 so that the backshell 200 is rotatable relative to the backplane 1.

Figure 1:
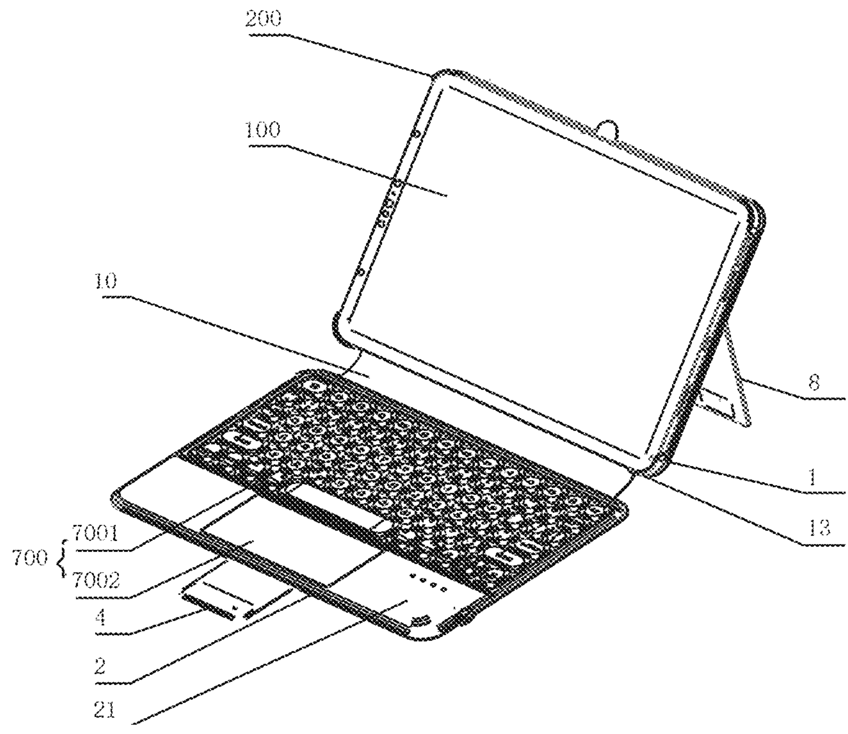
FIG. 1 is an axonometric drawing with a protective sleeve of a display device being in an open state in part of embodiments of the present application.
Figure 2:
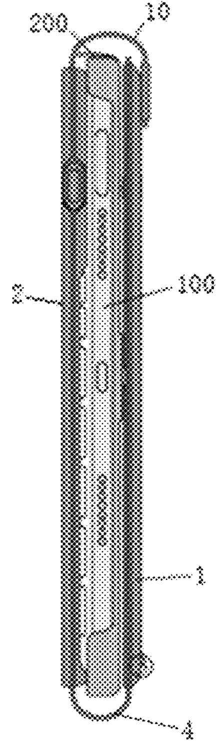
FIG. 2 is a schematic diagram with the protective sleeve of the display device being in a closed state in part of embodiments of the present application.

It is not difficult to see through the above content that, since the hinge assembly 2 of the protective support is flexibly connected with the backplane 1, the backplane 1 and the hinge assembly 2 are flippable relative to each other. Through the flipping of the backplane 1, an angle of the backshell 200 attached to the display device 100 can be adjusted in combination with FIG. 1, so that the display device 100 may display at any angle. The hinge assembly 2 may be flipped in a direction close to the backplane 1 to the limit position when the display device 100 is not used, as shown in FIG. 2, so that the hinge assembly 2 can be opposite to the backplane 1, and the display device 100 can be effectively protected through the hinge assembly 2 at this moment. In addition, as shown in FIG. 4, the protective support further includes a connecting assembly 3 arranged on the backplane 1 and slidable relative to the supporting side 13 of the backplane 1, and simultaneously, the connecting assembly 3 detachably connects to the backplane 200, and the backshell 200 is rotatable relative to the backplane 1 after being connected with the connecting assembly 3. Therefore, not only a height of the display device 100 can be adjusted, but the display device 100 can be switched between the horizontal screen and the vertical screen through the backshell 200, so that the display device 100 may meet the needs of more scenarios.

In particular, in some embodiments, the hinge assembly 2 at least includes a manipulation apparatus flexibly connected with the backplane 1, and the manipulation apparatus is used for manipulating the display device 100. As an alternative implement, in other embodiments, as shown in FIG. 1 and FIG. 3, the hinge assembly 2 at least includes a hinge plate 21 flexibly connected with the backplane 1, and the hinge plate 21 is used for being detachably provided with a manipulative apparatus 700 that may manipulate the display device 100. It should be noted that, in some embodiments, the control apparatus 700 includes a keyboard 7001 and/or a touch module 7002, through which the display device 100 may be effectively controlled. It should be noted that, the touch module 7002 may be a touch screen, touch board and other devices. Of course, the touch module 7002 may also be other touch devices, and the type of touch module 7002 is not described in detail here. In addition, as shown in FIG. 1 and FIG. 3, when the hinge assembly 2 includes a hinge plate 21 flexibly connected with the backplane 1, the user may install different control apparatus 700 according to the needs to meet the using needs of more scenarios since the hinge plate 21 is detachably provided with the manipulative apparatus 700. Moreover, as shown in FIG. 1, FIG. 2 and FIG. 3, the hinge plate 21 and the backplane 1 are connected as a whole through the flexible part 10 in order to achieve a flexible connection between the hinge plate 21 and the backplane 1. It should be noted that the flexible part 21 may be of banded parts of materials such as leather and gelatin, and the hinge plate 21 may be made to flip relative to the backplane 1 by means of the flexible member 21.

In addition, as shown in FIG. 1 and FIG. 3, in order to ensure the reliability of the protection of the display device 100 between the hinge assembly 2 and the backplane 1 when the hinge assembly 2 is flipped in a direction close to the backplane 1 to the limit position, a bendable hinge lug 4 is arranged on a side of the hinge assembly 2 opposite to a side of the hinge assembly connected with the backplane 1, and the hinge lug 4 is detachably connected with backplane 1 when the hinge assembly 2 is flipped in the direction close to the backplane to the limit position. For example, in combination with FIG. 2, the hinge lug 4 may be connected with the backplane 1 by buckle, or the hinge lug 4 may also be connected with the backplane 1 by magnetic attachment.

Figure 5:
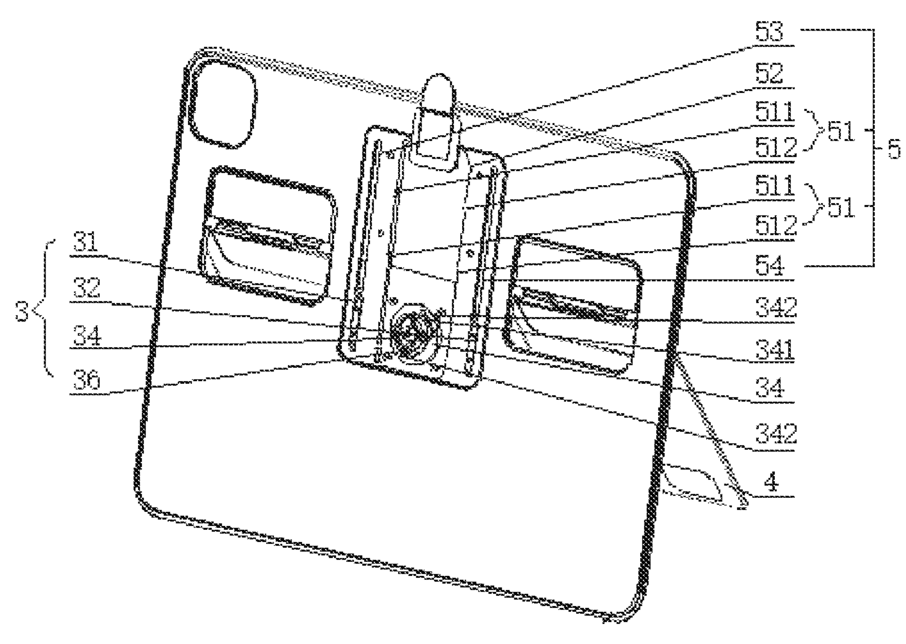
FIG. 5 is an axonometric drawing with the backplane being connected with the connecting assembly after a cover plate being removed in part of embodiments of the present application.
Figure 6:
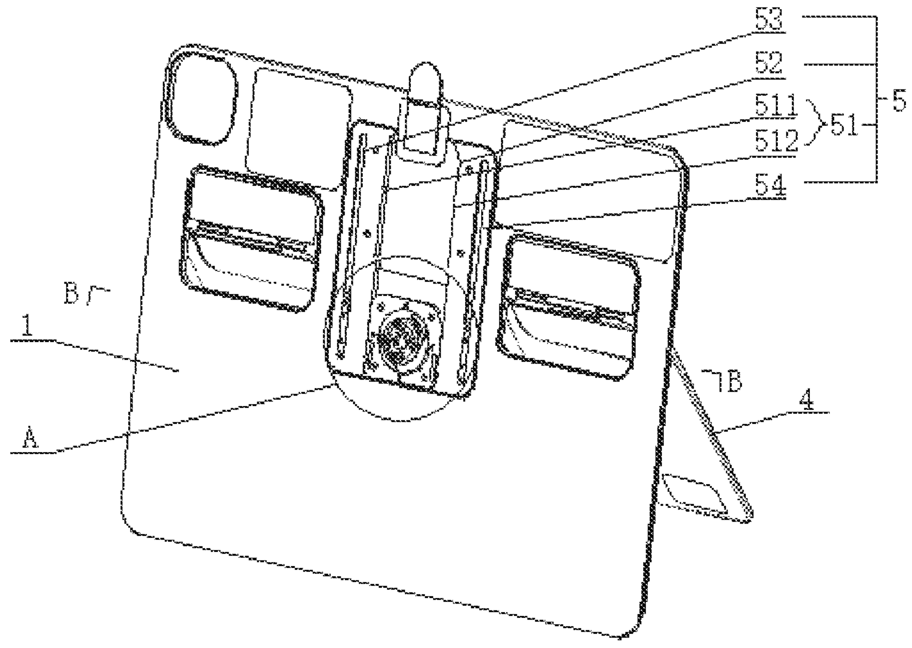
FIG. 6 is an axonometric drawing of the backplane with a slider sliding on a rail member in part of embodiments of the present application.

In addition, in some embodiments, as shown in FIG. 4, FIG. 5 and FIG. 6, in order to enable the connecting assembly 3 to move in a direction relative to the supporting side 13 of the backplane 1, the protective support further includes a rail member 5. Moreover, the rail member 5 is arranged on the backplane 1, and slidably connected with the connecting assembly 3 so that the connecting assembly 3 is slidable relative to the supporting side 13 of the backplane 1.

Figure 8:
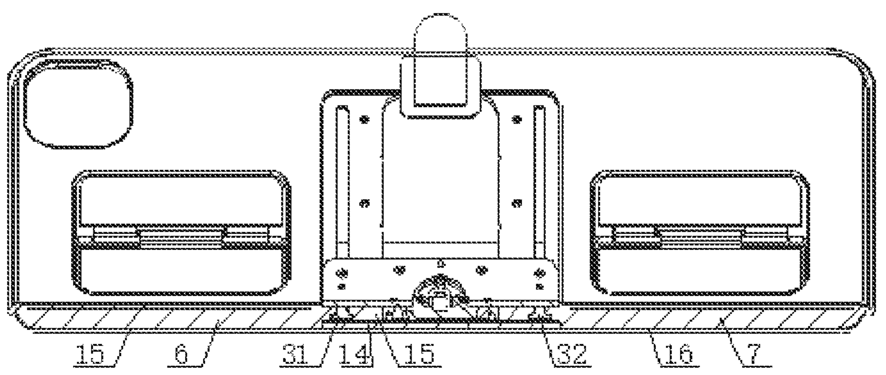
FIG. 8 is a cross-sectional view of B-B in FIG. 6.

Moreover, in order to implement the installation of the rail member 5 on the backplane 1, in some embodiments, in combination with FIG. 8, the front side 11 of the backplane 1 is provided with a mounting groove 14 in which the rail member 5 may be directly embedded. The rail member 5 and the backplane 1 may be connected in an engaging mode, or may also be fixedly connected by bolts and other locking parts. For example, as shown in FIG. 8, when the rail member 5 is embedded in the mounting groove 14, a first engaging groove 15 and a second engaging groove 16 connected to the mounting groove 14 are also arranged on the backplane 1. Corresponding to the first engaging groove 15 and the second engaging groove 16, the rail member 5 respectively form a first extension 6 that may be embedded in the first engaging groove 15 and a second extension 7 that may be embedded in the second engaging groove 16. So that it is not difficult to see that through the cooperation of the first engaging groove 15 and the first extension 6, and the cooperation of the second engaging groove 16 and the second extension 7, the rail member 5 can be well engaged into the mounting groove 14 of the backplane 1. Moreover, it is worth noting that, as shown in FIG. 4 and FIG. 5, the rail member 5 is also provided with a plurality of first engaging positions 51, so that the connecting assembly 3 can be held at any of the first engaging positions 51 when sliding relative to the supporting side 13 of the backplane 1.

It is worth mentioning that, in order to make the connecting assembly 3 slide on the rail member 5 in a direction perpendicular to the supporting side 13 of the backplane 1, and simultaneously, to make the backshell 200 rotate relative to the backplane 1 with the help of the connecting assembly 3, in some embodiments, as shown in FIG. 4 and FIG. 5, the rail member 5 is provided with a chute 52 in a direction perpendicular to the supporting side 13, a first rail groove 53 and a second rail groove 54 parallel to the chute 52. In conjunction with FIG. 4, FIG. 5, FIG. 6 and FIG. 7, corresponding to the chute 52, the first rail groove 53 and the second rail groove 54, the connecting assembly 3 includes: a first slide rail 31 slidably arranged in the first rail groove 53, a second slide rail 32 slidably arranged in the second rail groove 54, a slider 33 slidably arranged in the chute 52, a rotating shaft member 34 rotatably connected with the slider 33, and a cover plate 35 covered on the rail member 5 and connected with the first slide rail 31 and the second slide rail 32 respectively. As shown in FIG. 4, the cover plate 35 is provided with a shaft hole (not shown) which may be partially traversed by the rotating shaft member 34, so that the rotating shaft member 34 and the cover plate 35 are rotatable relative to each other. It is not difficult to see from this that since the cover plate 35 is connected with the first slide rail 31 and the second slide rail 32 respectively, the cover plate 35 is rotatable in the direction perpendicular to the supporting side 13 of the backplane 1, by the help of the sliding fit of the first slide rail 31 and the second slide rail 32 with the first rail groove 53 and the second rail groove 54 respectively. Since the cover plate 35 is provided with a shaft hole 351 that may be partially traversed by the rotating shaft member 34, the backshell 200 may rotate through the rotating shaft member 34 relative to the backplane 1 without affecting the rotational property of the backshell 200 while ensuring that the rotating shaft member 34 can be reliably connected with the backshell 200.

Figure 7:
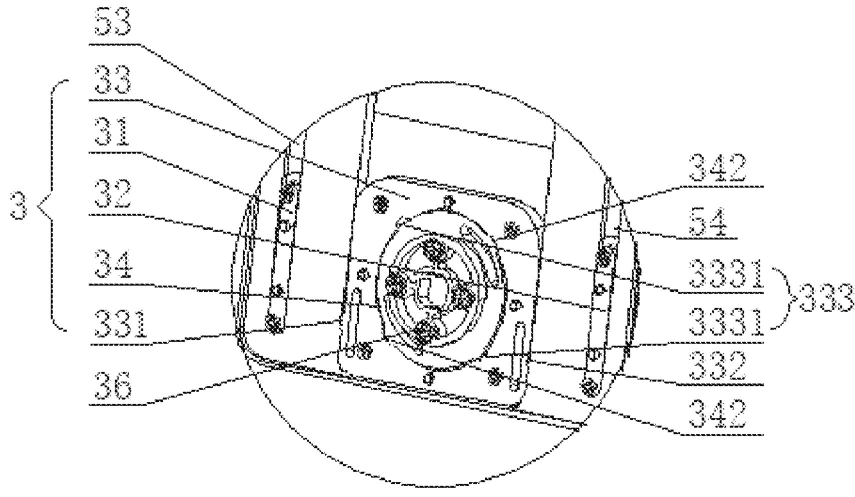
FIG. 7 is a partial enlarged view of Part A in FIG. 6.

In addition, as shown in FIG. 6 and FIG. 7, the connecting assembly 3 may be held at any of the first engaging positions 51 of the rail member 5 when sliding relative to the supporting side 13 of the backplane 1. In some embodiments, as shown in FIG. 6 and FIG. 7, in order to make the first engaging position 51 play a role of holding on the sliding of the connecting assembly 3, the chute 52 is provided with a plurality of first engaging points 511 and a plurality of second engaging points 512 along an extension direction of the chute, the number of the first engaging points and the number of the second engaging points is the same, and uniquely corresponding to each other. Any uniquely corresponding first engaging point and second engaging point are arranged opposite to each other and constitute the first engaging position 51. The slider 33 is provided with a first engaging portion 331 engaged with any of the first engaging points 511, and a second engaging portion 332 engaged with any of the second engaging points 512. For example, in some embodiments, as shown in FIG. 5, each of the first engaging points 511 is a first engaging groove arranged on a wall on a side of the chute 52, and each of the second engaging points 512 is a second engaging groove arranged on a wall on the other side of the chute 52. As shown in FIG. 6 and FIG. 7, corresponding to each of the first and the second engaging grooves, the first engaging portion 331 is a first projection engaged with the first engaging groove, and the second engaging portion 332 is a second projection engaged with the second engaging groove, so that the cover plate 35 may drive the rotating shaft member 34 and the slider 33 to slide together when sliding in the direction perpendicular to the supporting side 13 of backplane 1 by the first slide rail 31 and the second slide rail 32, and when the slider 33 slides to any of the first engaging positions 51, the first projection and the second projection arranged on slider 33 may be engaged into the first engaging groove and the second engaging groove respectively, thereby enabling the connecting assembly 3 to implement a hovering state at the first engaging position 51, so as to ensure that the user may effectively adjust the actual display height of the display device 100 in actual usage scenarios. It should be noted that each of the first engaging points 511 and the second engaging points 512 mentioned above are only illustrated with the first engaging groove and the second engaging groove as examples, respectively. The first engaging portion 331 and the second engaging portion 332 are also illustrated only with the first projection and the second projection as examples, respectively. As an alternative implement, in other embodiments, each of the first engaging points 511 and the second engaging points 512 may adopt the structure of projection. Corresponding to the projection structure of the first engaging point 511 and the second engaging point 512, the first engaging portion 331 and the second engaging portion 332 may adopt an engaging groove structure engaged by the projection, while the structure of the first engaging point 511 and the second engaging point 512, and the structure of the first engaging portion 331 and the second engaging portion 332 are not particularly limited herein.

Moreover, as a preferred embodiment, as shown in FIG. 5 and FIG. 7, each of the first engaging grooves and each of the second engaging grooves may be arcuate grooves, and likewise the first projection and the second projection may be circular arc projections, so that when the connecting assembly 3 is held at any of the first engaging position 51, if the connecting assembly 3 slides again, the circular arc projections may match with the arcuate of the arcuate groove to reduce the resistance that the connecting assembly 3 is subjected to when sliding again. While each of the first engaging positions 51 plays a role of holding the connecting assembly 3, it can also be more convenient for user to adjust the height of the display device. In addition, as shown in FIG. 5, in order to achieve a detachable connection between the rotating shaft member 34 and the backshell 200, at least one threaded hole 341 may be arranged on one end of the rotating shaft member 34 passing through the shaft hole 351 of the cover plate 35, and through a form of the threaded hole 341 combined with a bolt 36, the detachable connection between the rotating shaft member 34 and the backshell 200 is achieved. In other embodiments, the rotating shaft member 34 and the backshell 200 may also be detachably connected by buckle. It should be noted that, in addition to the above two connection modes, the rotating shaft member 34 and the backshell 200 may also adopt other detachable connection modes, and the detailed description is not repeated herein.

Figure 9:
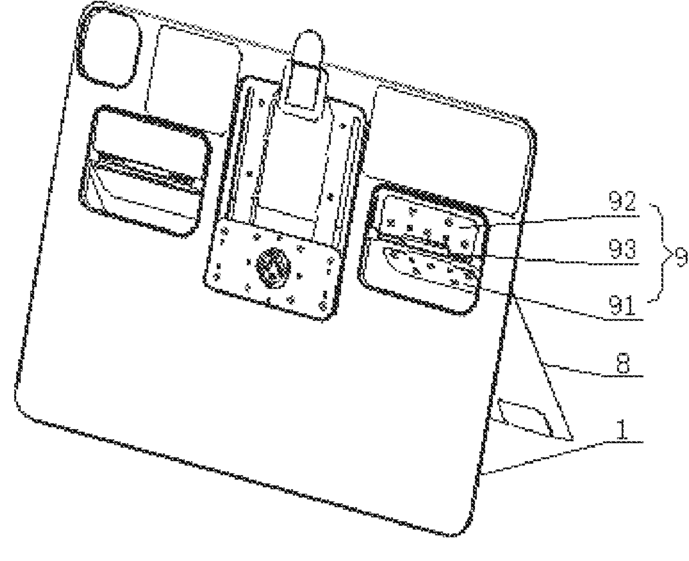
FIG. 9 is an axonometric drawing with a hinge being connected with the backplane and a supporting plate respectively in part of embodiments of the present application.

In addition, in some embodiments, as shown in FIG. 1 and FIG. 3, in order to ensure the supporting property of the backplane 1, the protective support further includes: a supporting plate 8 rotatably arranged on the rear side 12 of the backplane 1, so that the supporting plate 8 is rotatable relative to the backplane 1. Through the rotation of the supporting plate 8, the supporting plate 8 may implement the backplane 1 at any angle, so as to ensure that the display device 100 may meet the needs of more scenarios. Moreover, as shown in FIG. 9, in order to make the supporting plate 8 rotate relative to the backplane 1, the supporting plate 8 and the backplane 1 may be connected through a hinge 9. As shown in FIG. 9, the hinge 9 includes: a first hinge 91, a second hinge 92, a rotating shaft 93 arranged on the first hinge 91 or the second hinge 92, where the first hinge 91 and the second hinge 92 are rotatably connected with each other through the rotating shaft 93. As shown in FIG. 9, the first hinge 91 may be arranged on the supporting plate 8, and the second hinge 92 may be arranged on the backplane 1, so that the supporting plate 8 may rotate relative to the backplane 1 with the help of hinge 9, so that the supporting plate 8 may implement the support of the backplane 1 at any angle. Moreover, in order to improve the supporting property of the supporting plate 8 on the backplane 1, in some embodiments, the rotating shaft 93 may be interference matched with the first hinge 91 or the second hinge 92, so that when the first hinge 91 and the second hinge 93 rotate to any angle relative to each other, the rotating shaft 93 may have a certain preload force with the first hinge 91 or the second hinge 92, so that the supporting plate 8 and the backplane 1 can be always kept at the current angle, which further improves the supporting property of the supporting plate 8 against the backplane 1. It should be noted that, the above-mentioned hinge 9 is only illustrated by the combination of the first hinge 91, the second hinge 92 and the rotating shaft 93 as an example, while in other embodiments, the hinge 9 may also adopt other combination modes, such as the hinge 9 may be a hinge, and the structure of the hinge 9 is not particularly limited here.

In addition, the slider 33 is provided with a rotating shaft groove (not shown) that may be partially embedded by the rotating shaft member 34. As shown in FIG. 7, and the rotating shaft groove is provided with a plurality of second engaging positions 333 around an axis direction of the rotating shaft groove, so that the rotating shaft member 34 may be engaged with any of the second engaging positions 333 when rotating with an axis of the rotating shaft groove as a pivot axis. By providing the rotating shaft groove on the slider 33, and arranging the second engaging position 333 in the rotating shaft groove simultaneously, the backshell 200 is engaged with any of the second engaging positions 333 when utilizing the rotating shaft member 34 to rotate relative to the backplane 1, so that the display device 100 may switch between horizontal screen display and vertical screen display. As shown in FIG. 7, in order to implement the engagement of the second engaging position 333 with the rotating shaft member 34, the second engaging position 333 includes: at least one limiting groove 3331 arranged on a wall of the rotating shaft groove. Corresponding to each of the limiting grooves 3331, the rotating shaft member 345 is provided with at least one projection 342 around its circumference engaged with any of the limiting grooves 3331. When the backshell 200 rotates to any of the second engaging positions 333 relative to the backplane 1 with the help of the rotating shaft member 345, the projection portion 342 on the rotating shaft member 345 may be engaged into the corresponding limiting groove 3331, so that the display device 100 may be kept at any deflection angle. For example, the backshell 200 may be engaged with any limiting groove 3331 through the projection portion 342 of the rotating shaft member 34, so that the display device 100 may switch between horizontal screen display and vertical screen display. As an alternative implement, in other embodiments, each of the second engaging positions 333 may also adopt the structure of projection. Corresponding to each of the projection structures of the second engaging position 333, the rotating shaft member 345 is provided with at least one trough-like structure around its circumference engaged by the projection, and the structure of the second engaging position 333 is not particularly limited herein.

Moreover, as a preferred embodiment, as shown in FIG. 7, each of the limiting grooves 3331 may also adopt the structure of arcuate groove. Likewise, each of the projection portion 342 may be circular arc protrusion, so that when the projection portion 342 is engaged in any one of the limiting grooves 3331, such as the rotating shaft member 34 being rotated again, with the help of the match between the circular arc projection and the arc groove, the resistance that the rotating shaft member 34 subjected to when rotating again is reduced, so that when each of the second engaging positions 333 has the engaging effect on the rotating shaft member 34, it may also be more convenient for the user to adjust the rotation angle of the display device 100.

In addition, in other embodiments, as shown in FIG. 1 and FIG. 3, a protective sleeve for the display device is provided, including: a protective support and a backshell 200 as described above. The backshell 200 is arranged on the front side 11 of the backplane 1, and the backshell 200 is detachably connected with the connecting assembly 3.

In addition, as shown in FIG. 1, the backshell 200 is attachable to the display device 100, and the backshell 200 is rotatable relative to backplane 1 through the connecting assembly 3.

Through the above content, it is not difficult to see that since the hinge assembly 2 of the protective support is flexibly connected with the backplane 1, so that the backplane 1 and the hinge assembly 2 are flappable relative to each other. In combination with FIG. 1, through the flip of the backplane 1, the angle of the backshell 200 attached to the display device 100 may be adjusted, so that the display device 100 may display at any angle. When the display device 100 is not used, the hinge assembly 2 may be flipped in a direction close to the backplane 1 to the limit position, as shown in FIG. 2, so that the hinge assembly 2 may opposite to the backplane 1 again, and the display device 100 may be effectively protected through the hinge assembly 2 at this moment. In addition, as shown in FIG. 4, since the protective support further includes a connecting assembly 3 arranged on the backplane 1 and slidable relative to the supporting side 13 of the backplane 1, and simultaneously, the connecting assembly 3 is detachably connected with backshell 200, and, after connecting with connecting assembly 3, the backshell 200 can be rotatable relative to the backplane 1. Therefore, through the backshell 200, not only the height of the display device 100 can be adjusted, but also the display device 100 can be switched between the horizontal screen and the vertical screen, so that the display device 100 can meet the use needs of more scenarios.

Particularly, as shown in FIG. 3 and FIG. 7, the backshell 200 and the rotating shaft member 34 may be fixedly connected by bolt. In other embodiments, the backshell 200 and the rotating shaft member 34 may also adopt other connection modes, such as engaging connections, and the connection mode between the backshell 200 and the rotating shaft member 34 is not particularly limited herein.

In addition, as shown in FIG. 10, FIG. 11, FIG. 12 and FIG. 13, in other embodiments, a protective sleeve apparatus is provided, including: a protective sleeve as described above, a first driving module 300, a second driving module 400 and a main control unit 500.

The first driving module 300 is used for driving the connecting assembly 3, so that the connecting assembly 3 may drive the backshell 200 to slide relative to the supporting side 13 of the backplane 1, and the second driving module 400 is used for driving the connecting assembly 3, so that the connecting assembly 3 may drive the backshell 200 to rotate relative to the backplane 1.

Figure 12:
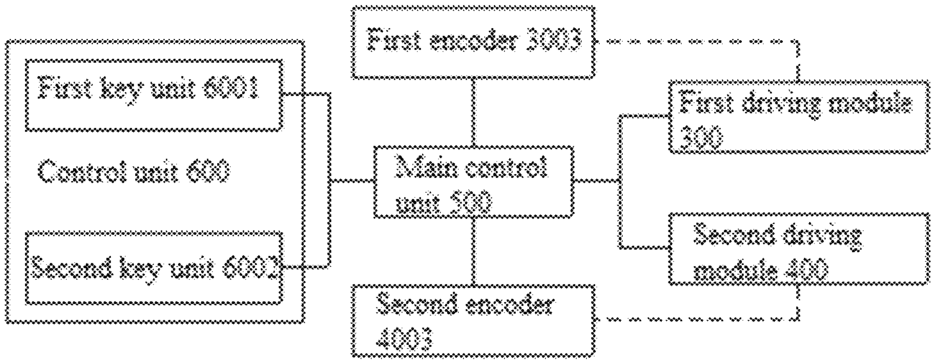
FIG. 12 is a block diagram of the system module of a protective sleeve apparatus in part of embodiments of the present application.

In addition, in combination with FIG. 12, the main control unit 500 is also electrically connected with the first driving module 300 and the second driving module 400 respectively. The main control unit 500 is used for judging whether the backshell 200 is in a preset position away from the supporting side 13 according to a first instruction received, and controlling the first driving module 300 when judging that the backshell 200 is not in the preset position, so that the first driving module 300 drives the connecting assembly 3 to move in a direction away from the supporting side 13. The main control unit 500 is also used for controlling the second driving module 400 when judging that the backshell 200 is in the preset position, so that the second driving module 400 drives the connecting assembly 3 to drive the backshell 200 to rotate to the vertical state.

In addition, in combination with FIG. 12, the main control unit 500 is used for judging whether the backshell 200 is in an initial position close to the supporting side 13 according to the second instruction received, and controlling the first driving module 300 when judging that the backshell 200 is not in the initial position, so that the first driving module 300 drives the connecting assembly 3 to move in a direction close to the supporting side 13. The main control unit 500 is also used for controlling the first driving module 300 when judging that the backshell 200 is in the initial position, so that the first driving module 300 drives the connecting assembly 3 to drive the backshell 200 to rotate to a transverse state.

Through the above content, it is not difficult to see that the first driving module 300 may be used to drive the connecting assembly 3 to slide relative to the supporting side 13 of the backplane 1, and the second driving module 400 may be used to drive the connecting assembly 3 to drive the backshell 200 to rotate relative to the backplane 1. Through the reception of the first instruction and the second instruction by the main control unit 500, the main control unit 500 may effectively control the first driving module 300 and the second driving module 400 respectively, thereby facilitating the user to effectively switch the display device 100 between the horizontal screen display and the vertical screen display.

Figure 10:
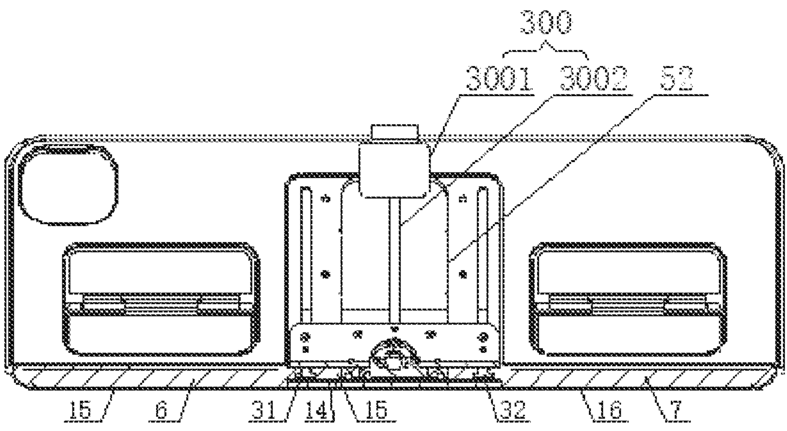
FIG. 10 is a schematic diagram of the backplane with a first driving module being added in part of embodiments of the present application.

Particularly, in some embodiments, as shown in FIG. 10, the first driving module 300 includes: a first motor 3001 arranged on the backplane 1 and a screw rod 3002 connected with the main shaft of the first motor 3001. The screw rod 3002 is arranged along a direction perpendicular to the supporting side 13 of the slide plate 1, and the screw rod 3002 is also connected to the connecting assembly 3 of the slider 33. In addition, in combination with FIG. 12, the first motor 3001 is also electrically connected with the main control unit 500, so that the first motor 3001 can drive the screw rod 3002 to rotate under the control of the main control unit 500, and when the screw rod 3002 rotates, the self-rotating motion may be transformed into a linear slide of the slider 33 relative to the supporting side 13 of the slide plate 1.

Figure 11:
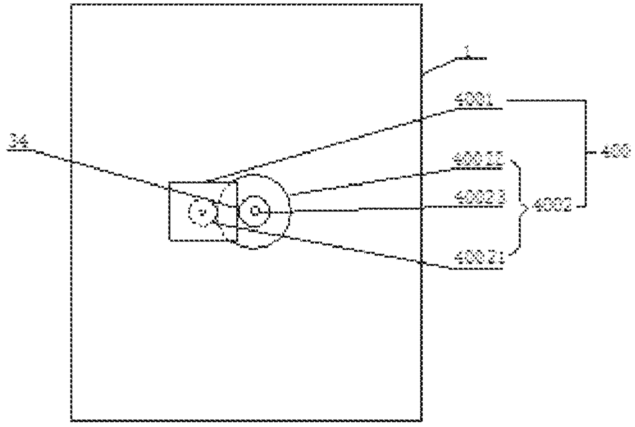
FIG. 11 is a schematic diagram of the backplane with a second driving module being added in part of embodiments of the present application.

In addition, in other embodiments, as shown in FIG. 11, the second driving module 400 includes: a second motor 4001 arranged on the backside 12 of the backplane 1 and a gear set 4002 connected with the main shaft of the second motor 4001. As shown in FIG. 1, the gear set 4002 includes: a driving gear 40021 set on the main shaft of the second motor 4001 and a driven gear 40022 engaged with the driving gear 40021, and a transmission shaft 40023 respectively coaxially connected with the rotating shaft member 34 and the driven gear 40022. In addition, as shown in FIG. 12, the second motor 4001 is also electrically connected with the main control unit 500, so that the second motor 4001 may drive the driving gear 40021 to rotate under the control of the main control unit 500, and the driving gear 40021 may synchronously drive the driven gear 40022 to rotate by virtue of the engagement with the driven gear 40022 when rotating, and finally the driven gear 40022 is driven to rotate by the driven gear 40022 through the transmission shaft 40023, so that the angle of the backshell 200 may be adjusted.

In addition, it is worth mentioning that, in order to control the stroke of the slider 33, in some embodiments, a first encoder 3003 may be arranged on the first motor 3001. As shown in FIG. 12, the first encoder 3003 may be electrically connected with the main control unit 500, the rotation angle of the main shaft of the first motor 3001 when rotating may be detected through the first encoder 3003. The main control unit 500 may obtain the rotation angle detected by the first encoder 3003 in real time, and calculate the sliding stroke of the slider 33 on the backplane 1 through the detected rotation angle. Once the sliding stroke of slider 33 calculated by the main control unit 500 reaches the preset stroke, that is, the slider 33 has slipped to the preset position or the initial position at this moment, the main control unit 500 may control the first motor 3001 to stop working at this moment. Likewise, in order to be able to detect the rotation angle of the shaft member 34, a second encoder 4003 may be arranged on the second motor 4001. In combination with FIG. 12, the second encoder 4003 may be electrically connected with the main control unit 500, the rotation angle of the main shaft of the second motor 4001 when rotating can be detected through the second encoder 4003. The main control unit 500 may obtain the rotation angle detected by the second encoder 4003 in real time, and calculate the rotation angle of the rotating shaft member 34 through the detected rotation angle. Once the rotation angle of the rotating shaft member 34 calculated by main control unit 500 reaches the preset angle, that is, the rotating shaft member 34 has driven the backshell 200 to rotate to a transverse state or a vertical state at this moment, the main control unit 500 may control the second motor 4001 to stop working at this moment.

Figure 13:
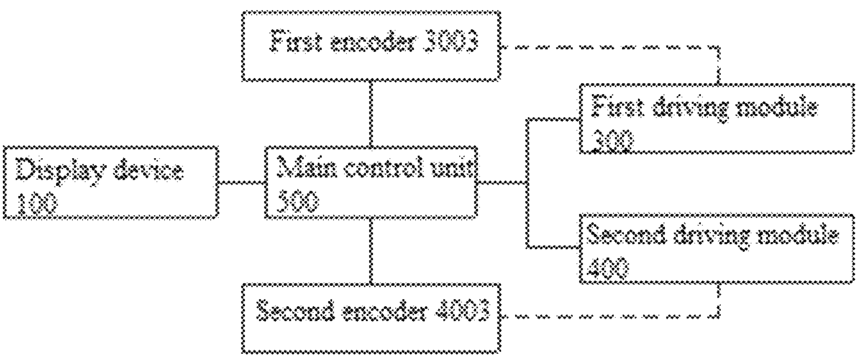
FIG. 13 is block diagram of the system module of another protective sleeve apparatus in part of embodiments of the present application.

Moreover, in order to enable the main control unit 500 to receive the first or the second instruction, in combination with FIG. 6, a corresponding control unit 600 may be arranged on the front side 11 of the backplane 1. In combination with FIG. 12, the control unit 600 may include: a first key unit 6001 and a second key unit 6002 electrically connected with the main control unit 500 respectively. The first key unit 6001 may send a first instruction to the main control unit 500, and the second key unit 6002 may send a second instruction to the main control unit 500. Moreover, it is worth noting that the main control unit 500 can use a microprocessor MCU or a programmable controller PLC, or other processors, and the type of the main control unit 500 is not particularly limited here. In addition, as a substitute implement, as shown in FIG. 13, the first instruction and the second instruction received by the main control unit 500 may also be sent by the display device 100. For example, a corresponding interface unit (not shown) may be arranged on the backplane 1. For example, the interface unit may use any of one or more combinations in USB-A interface unit, USB-B interface unit or USB-C interface unit, and the interface unit is electrically connected with the main control unit 600 respectively, so that after the backshell 200 is attached to the display device 100, the display device 100 may be communicated with the interface unit by means of the corresponding data transmission line, so that the user may use the display device 100 to send the first instruction or the second instruction to the main control unit 600, so that the display device 100 switch between horizontal screen display and vertical screen display.

Figure 14:
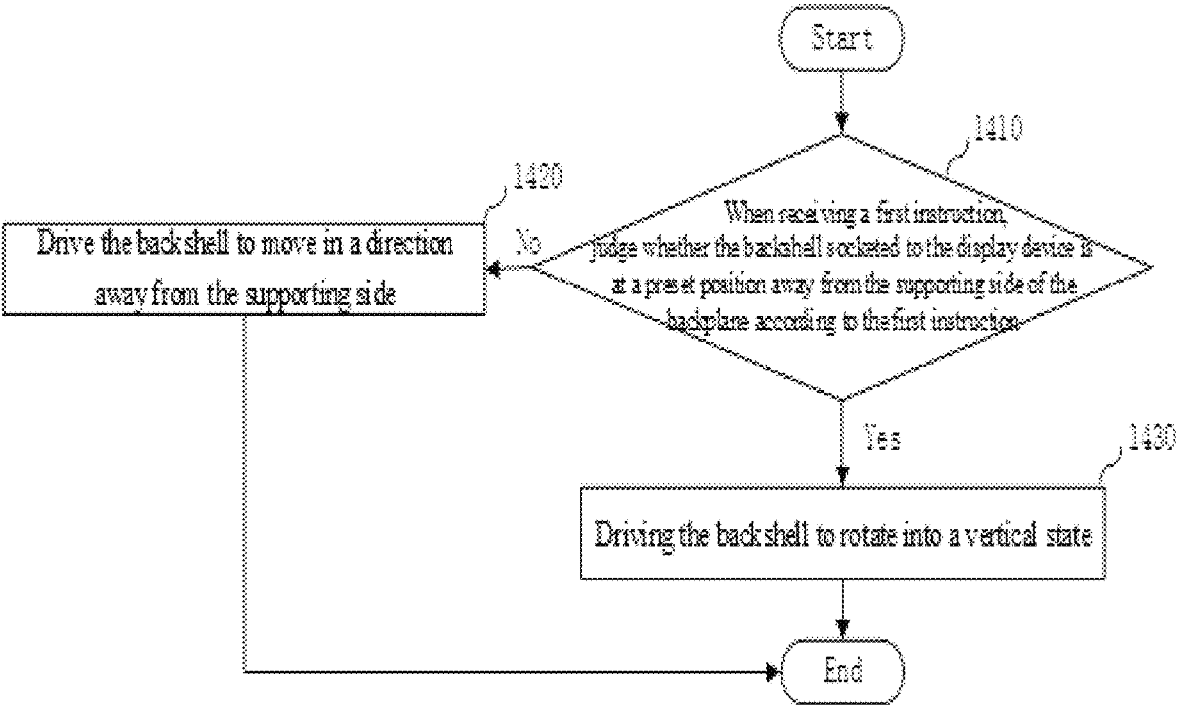
FIG. 14 is a flow diagram of a control method with the protective sleeve apparatus receiving a first instruction in part of embodiments of the present application.

In addition, in other embodiments, as shown in FIG. 14, a control method of the protective sleeve apparatus is provided, including the following steps:

In step 1410, when receiving a first instruction, judging whether the backshell 200 attached to the display device 100 is at a preset position away from the supporting side 13 of the backplane 1 according to the first instruction;

In step 1420, driving the backshell 200 to move in a direction away from the supporting side 13 if the backshell 200 is judged not in the preset position; and In step 1430, driving the backshell 200 to rotate into a vertical state if the backshell 200 is judged in the preset position.

Figure 15:
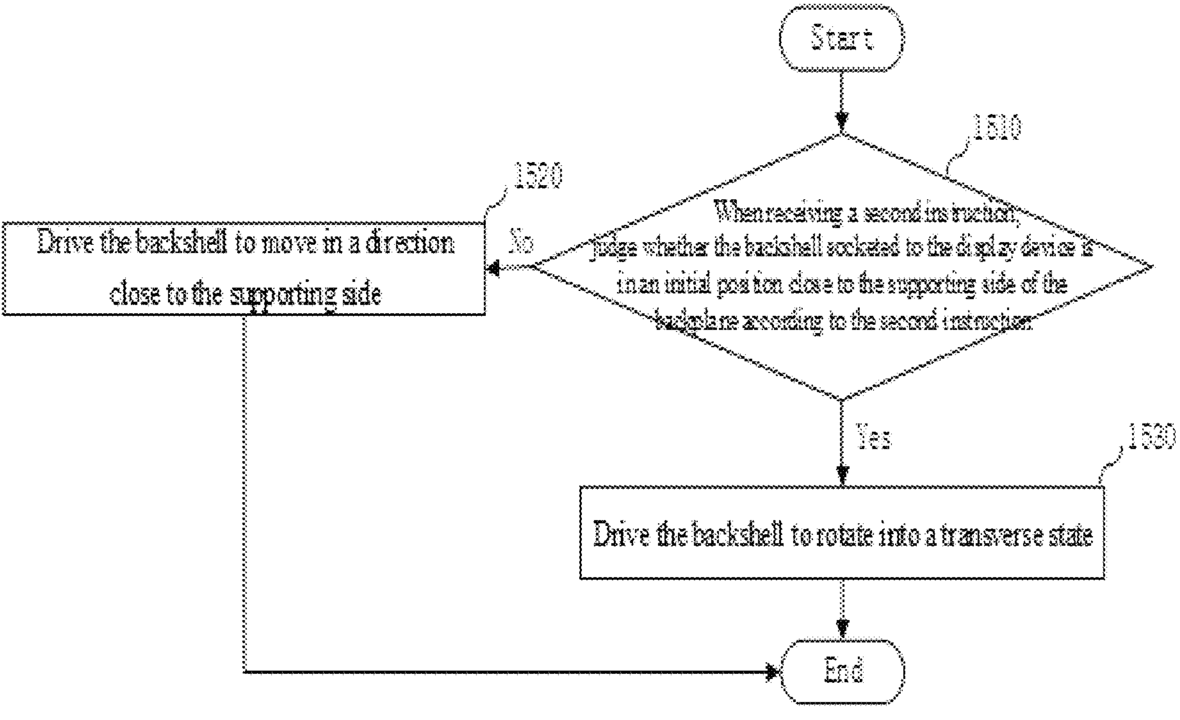
FIG. 15 is a flow diagram of the control method with the protective sleeve apparatus receiving a second instruction in part of embodiments of the present application.

In addition, in other embodiments, as shown in FIG. 15, a control method of the protective sleeve apparatus is provided, including the following steps:

In step 1510, when receiving a second instruction, judging whether the backshell 200 attached to the display device 100 is in an initial position close to the supporting side 13 of the backplane 1 according to the second instruction;

In step 1520, driving the backshell 200 to move in a direction close to the supporting side 13 if the backshell 200 is judged not in the initial position; and In step 1530, driving the backshell 200 to rotate into a transverse state if the backshell 200 is judged in the initial position.

Through the above content, it is not difficult to see that, through the reception of the first instruction and the second instruction by the protective sleeve apparatus, the protective sleeve apparatus may drive the backshell 200 to switch between the horizontal state and the vertical state. Therefore, the display device 100 may not only automatically implement the horizontal screen display, but also the vertical screen display, so that the display device 100 may meet the using needs of more scenarios.

Those skilled in the art may understand that the above-mentioned embodiments are specific embodiments of the present application. In practical application, various changes can be made to them in form and details without deviating from the spirit and scope of the present application.

What is claimed is:

1. A protective sleeve apparatus, comprising:

a protective sleeve, the protective sleeve including:

a backplane, comprising a front side that is able to carry a backshell for attaching to a display device, a rear side opposite to the front side, and a supporting side arranged between the front side and the rear side that enables the backplane to be supported at an arbitrary angle to a datum plane;

a hinge assembly, layable flat on the datum plane and flexibly connected with the backplane, so that the hinge assembly and the backplane are flippable relative to each other, and the hinge assembly and the front side of the backplane are opposite to each other when the hinge assembly is flipped in a direction close to the backplane to a limit position; a connecting assembly, arranged on the backplane and slidable relative to the supporting side of the backplane, wherein the connecting assembly is used for detachably connecting the backshell so that the backshell is rotatable relative to the backplane and the backshell, arranged on the front side of the backplane and detachably connected with the connecting assembly, wherein the backshell is attachable to the display device, and the backshell is rotatable relative to the backplane through the connecting assembly;

a first driving module, used for driving the connecting assembly, so that the connecting assembly drives the backshell slidable relative to the supporting side of the backplane;

a second driving module, used for driving the connecting assembly, so that the connecting assembly drives the backshell rotatable relative to the backplane; and a main control unit, electrically connected with the first driving module and the second driving module respectively;

wherein, the main control unit is used for judging whether the backshell is in a preset position away from the supporting side according to a first instruction received, and controlling the first driving module when judging that the backshell is not in the preset position, so that the first driving module drives the connecting assembly to move in a direction away from the supporting side; and the main control unit is further used for controlling the second driving module when judging that the backshell is in the preset position, so that the second driving module drives the connecting assembly to drive the backshell to rotate into a vertical state; and the main control unit is used for judging whether the backshell is in an initial position close to the supporting side according to a second instruction received, and controlling the first driving module when judging that the backshell is not in the initial position, so that the first driving module drives the connecting assembly to move in a direction close to the supporting side; and the main control unit is further used for controlling the first driving module when judging that the backshell is in the initial position, so that the first driving module drives the connecting assembly to drive the backshell to rotate into a transverse state.

2. The protective sleeve apparatus according to claim 1, wherein the hinge assembly at least comprises a manipulation apparatus flexibly connected with the backplane, and the manipulation apparatus is used for manipulating the display device; or the hinge assembly at least comprises a hinge plate flexibly connected with the backplane, and the hinge plate is used for detachably providing a manipulative apparatus that is able to manipulate the display device.

3. The protective sleeve apparatus according to claim 2, wherein the manipulation apparatus comprises a keyboard and/or a touch module.

4. The protective sleeve apparatus according to claim 2, wherein a bendable hinge lug is arranged on a side of the hinge assembly opposite to a side of the hinge assembly connected with the backplane, and the hinge lug is used for detachably connected with the backplane when the hinge assembly is flipped in the direction close to the backplane to the limit position.

5. The protective sleeve apparatus according to claim 1, wherein the protective support further comprises:

a rail member, arranged on the backplane and slidably connected with the connecting assembly, so that the connecting assembly is slidable relative to the supporting side;

wherein the rail member is further provided with a plurality of first engaging positions, so that the connecting assembly is able to be held at any of the first engaging positions when sliding relative to the supporting side.

6. The protective sleeve apparatus according to claim 5, wherein the rail member is provided with a chute in a direction perpendicular to the supporting side, and the rail member is provided with a first rail groove and a second rail groove parallel to the chute; and the connecting assembly comprises: a first slide rail slidably arranged in the first rail groove, a second slide rail slidably arranged in the second rail groove, a slider slidably arranged in the chute, a rotating shaft member rotatably connected with the slider, and a cover plate covered on the rail member and connected with the first slide rail and the second slide rail respectively, wherein the cover plate is provided with a shaft hole which is able to be partially traversed by the rotating shaft member so that the rotating shaft member and the cover plate are rotatable relative to each other;

wherein the chute is provided with a plurality of first engaging points and a plurality of second engaging points along an extension direction of the chute, the number of the first engaging points and the number of the second engaging points is the same, and uniquely corresponding to each other, and any uniquely corresponding first engaging point and second engaging point are arranged opposite to each other and constitute the first engaging position, and the slider is provided with a first engaging portion engaged with any of the first engaging points and a second engaging portion engaged with any of the second engaging points.

7. The protective sleeve apparatus according to claim 6, wherein each of the first engaging points is a first engaging groove arranged on a wall on a side of the chute, and each of the second engaging points is a second engaging groove arranged on a wall on the other side of the chute; and the first engaging portion is a first projection engaged with the first engaging groove, and the second engaging portion is a second projection engaged with the second engaging groove.

8. The protective sleeve apparatus according to claim 7, wherein each of the first engaging grooves and each of the second engaging grooves are arcuate grooves, and the first projection and the second projection are circular arc projections.

9. The protective sleeve apparatus according to claim 6, wherein the slider is provided with a rotating shaft groove partially embedded by the rotating shaft member, and the rotating shaft groove is provided with a plurality of second engaging positions around an axis direction of the rotating shaft groove, so that the rotating shaft member is engaged with any of the second engaging positions when rotating with an axis of the rotating shaft member as a pivot axis.

10. The protective sleeve apparatus according to claim 9, wherein the second engaging position comprises: at least one limiting groove arranged on a wall of the rotating shaft groove; and the rotating shaft member is circumferentially provided with at least one projection engaged with any of the limiting grooves.

11. The protective sleeve apparatus according to claim 10, wherein each of the limiting grooves is an arcuate groove, and each of the projections is a circular arc projection.

12. The protective sleeve apparatus according to claim 10, wherein the protective support further comprises:

a supporting plate rotatably arranged on the rear side of the backplane and rotatable relative to the backplane.

13. A control method of the protective sleeve apparatus, comprising the following steps:

when receiving a first instruction, judging whether a backshell attached to a display device is in a preset position away from a supporting side of a backplane according to the first instruction;

driving the backshell to move in a direction away from the supporting side if the backshell is judged not in the preset position;

driving the backshell to rotate into a vertical state if the backshell is judged in the preset position;

when receiving a second instruction, judging whether the backshell attached to the display device is in an initial position close to the supporting side of the backplane according to the second instruction;

driving the backshell to move in a direction close to the supporting side if the backshell is judged not in the initial position;

driving the backshell to rotate into a transverse state if the backshell is judged in the initial position.

* * * * *